United States Patent
Matsumoto et al.

(10) Patent No.: US 11,421,298 B2
(45) Date of Patent: *Aug. 23, 2022

(54) ELECTRIC RESISTANCE WELDED STEEL TUBE FOR COILED TUBING AND METHOD FOR MANUFACTURING THE SAME

(71) Applicant: JFE STEEL CORPORATION, Tokyo (JP)

(72) Inventors: Akihide Matsumoto, Tokyo (JP); Hiroshi Nakata, Tokyo (JP); Shunsuke Toyoda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 249 days.

This patent is subject to a terminal disclaimer.

(21) Appl. No.: 16/480,799

(22) PCT Filed: Dec. 14, 2017

(86) PCT No.: PCT/JP2017/044846
§ 371 (c)(1),
(2) Date: Jul. 25, 2019

(87) PCT Pub. No.: WO2018/139096
PCT Pub. Date: Aug. 2, 2018

(65) Prior Publication Data
US 2019/0390296 A1 Dec. 26, 2019

(30) Foreign Application Priority Data
Jan. 25, 2017 (JP) .............................. JP2017-010789

(51) Int. Cl.
*C21D 9/50* (2006.01)
*C21D 6/00* (2006.01)
(Continued)

(52) U.S. Cl.
CPC ............... *C21D 9/50* (2013.01); *C21D 6/004* (2013.01); *C21D 6/005* (2013.01); *C21D 6/008* (2013.01);
(Continued)

(58) Field of Classification Search
CPC .......... C21D 9/50; C21D 6/004; C21D 6/005; C21D 6/008; C21D 8/105; C21D 9/08;
(Continued)

(56) References Cited

U.S. PATENT DOCUMENTS 8,728,257 B2   5/2014  Oi et al.
2008/0110535 A1*  5/2008  Oi ........................... C22C 38/22
                                                                148/663
(Continued)

FOREIGN PATENT DOCUMENTS

CN   103249854 A   8/2013
EP   2484791 A1   8/2012
(Continued)

OTHER PUBLICATIONS

Singh, Pipeline integrity handbook, 2014, Elsevier, p. 180-182 (Year: 2014).*
(Continued)

*Primary Examiner* — Christopher S Kessler
*Assistant Examiner* — Andrew M Cheung
(74) *Attorney, Agent, or Firm* — Oliff PLC

(57) ABSTRACT

There is provided an electric resistance welded steel tube having a yield strength of 896 MPa or more, and excellent low-cycle fatigue resistance, for coiled tubing without performing whole-tube quenching treatment and reheating-tempering treatment after performing electric resistance welding and a method for manufacturing the same. The steel tube includes, by mass %, C, Si, Mn, P, S, Al, Cr, Cu, Ni, Mo, Nb, V, Ti, and N at a specific content. The steel tube has
(Continued)

a microstructure that contains 2% to 10% retained austenite and 20% or less martensite on a volume fraction basis, and the remainder being bainite. The yield strength is set to 896 MPa or more and the uniform elongation is set to 9.0% or more.

5 Claims, 1 Drawing Sheet

(51) Int. Cl.
    *C21D 8/10*     (2006.01)
    *C21D 9/08*     (2006.01)
    *C22C 38/00*     (2006.01)
    *C22C 38/02*     (2006.01)
    *C22C 38/06*     (2006.01)
    *C22C 38/42*     (2006.01)
    *C22C 38/44*     (2006.01)
    *C22C 38/46*     (2006.01)
    *C22C 38/48*     (2006.01)
    *C22C 38/50*     (2006.01)
    *C22C 38/58*     (2006.01)

(52) U.S. Cl.
    CPC .............. *C21D 8/105* (2013.01); *C21D 9/08* (2013.01); *C22C 38/001* (2013.01); *C22C 38/002* (2013.01); *C22C 38/008* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *C21D 2211/001* (2013.01); *C21D 2211/002* (2013.01); *C21D 2211/008* (2013.01)

(58) Field of Classification Search
    CPC ........ C21D 2211/001; C21D 2211/002; C21D 2211/008; C22C 38/001; C22C 38/002; C22C 38/008; C22C 38/02; C22C 38/06; C22C 38/42; C22C 38/44; C22C 38/46; C22C 38/48; C22C 38/50; C22C 38/58
    See application file for complete search history.

(56) References Cited

U.S. PATENT DOCUMENTS

2012/0186686 A1    7/2012   Valdez et al.
2014/0290807 A1*  10/2014   Goto ................ C22C 38/06
                                                          148/506

FOREIGN PATENT DOCUMENTS

| EP | 2752499 A1 | | 7/2014 |
|----|------------|---|--------|
| JP | 2001-303206 A | | 10/2001 |
| JP | 2005350724 A | * | 12/2005 |
| JP | 2005350724 A | | 12/2005 |
| JP | 2008-95156 A | | 4/2008 |
| JP | 2008095156 A | * | 4/2008 |
| JP | 2010-111931 A | | 5/2010 |
| JP | 2012-214875 A | | 11/2012 |
| JP | 2014-208888 A | | 11/2014 |
| JP | 2017-125245 A | | 7/2017 |
| KR | 920006604 B1 | | 8/1992 |
| KR | 20120062006 A | | 6/2012 |
| WO | 2013/108861 A1 | | 7/2013 |
| WO | 2016/143270 A1 | | 9/2016 |

OTHER PUBLICATIONS

Oct. 14, 2020 Office Action issued in Chinese Patent Application No. 201780084521.1.
Mar. 13, 2018 International Search Report issued in International Patent Application No. PCT/JP2017/044846.
Dec. 3, 2020 Office Action issued in Korean Patent Application No. 10-2019-7021803.

* cited by examiner

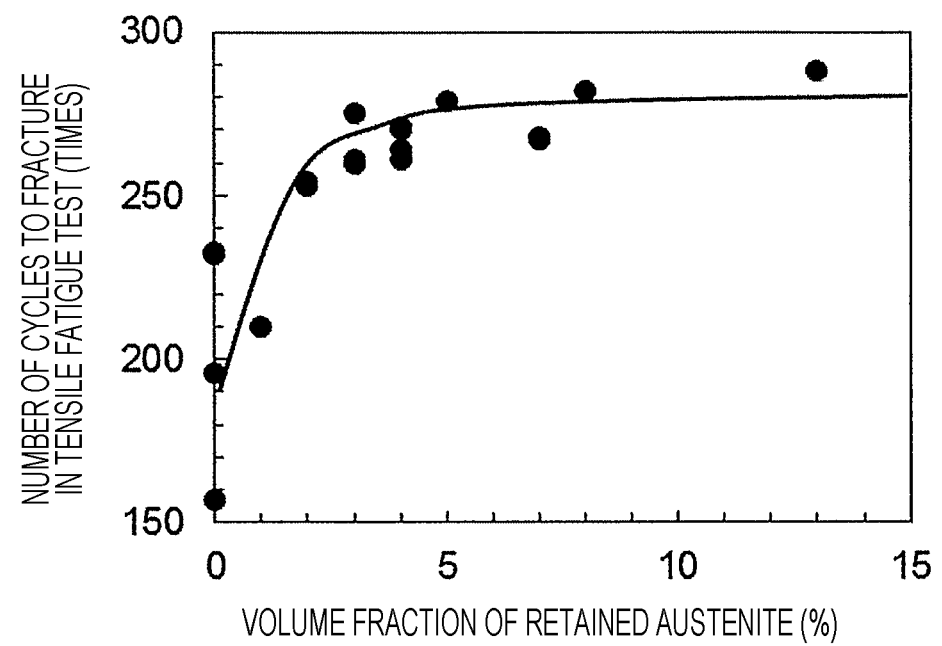

ELECTRIC RESISTANCE WELDED STEEL TUBE FOR COILED TUBING AND METHOD FOR MANUFACTURING THE SAME

TECHNICAL FIELD

This application relates to an electric resistance welded steel tube, having excellent fatigue resistance, for coiled tubing and a method for manufacturing the same.

BACKGROUND

Coiled tubing is one obtained by coiling a small-diameter long steel tube with an outside diameter of about 20 mm to 100 mm on a reel. Coiled tubing has been widely used in various well operations, which is uncoiled from a reel in an operation and inserted into a well, and then pulled up from the well after the operation, and is rewound onto the reel. In particular, in recent years, coiled tubing has been used to hydraulically fracture shale layers in the mining of shale gas. Coiled tubing offers smaller equipment as compared to conventional well recovery and drilling units, enables therefore saving of footprint and number of workers, and has an advantage that the operation efficiency is high because tubes need not be connected and continuous tripping is possible.

Coiled tubing is a steel tube which is manufactured in such a manner that a hot-rolled steel sheet serving as raw material is longitudinally slit into a steel strip with an appropriate width and the steel strip is rolled into a tube form and is subjected to electric resistance welding. Thereafter, whole-tube heat treatment is performed for the purpose of increasing the quality of a weld or obtaining desired mechanical properties.

From the viewpoint of preventing fractures in wells, coiled tubing is required to have particularly high strength for longitudinal direction. In recent years, in order to cope with longer, deeper wells, coiled tubing has increased in strength and, in particular, coiled tubing with a yield strength of 130 ksi (896 MPa) or more has been required.

On the other hand, coiled tubing is required to have low-cycle fatigue resistance because coiled tubing is repeatedly used in operation while being plastically strained up to about 2% to 3% depending on the outside diameter thereof and the diameter of a reel or the radius of curvature of a curved guide section of peripheral equipment multiple times.

Patent Literature 1 proposes a hot-rolled steel sheet for coiled tubing, the hot-rolled steel sheet having a microstructure dominated by one of ferrite, pearlite, or bainite, and also proposes a method for manufacturing the same. In this technique, the microstructure of the hot-rolled steel sheet for coiled tubing, the microstructure being dominated by bainite or the like, is formed during hot rolling. That is, it is not necessary to form the microstructure dominated thereby during heat treatment after hot rolling. However, this technique relates to a hot-rolled steel sheet for coiled tubing and lacks detailed descriptions of yield strength and low-cycle fatigue resistance after tube making.

Patent Literature 2 proposes a stainless steel for coiled tubing. The stainless steel has a steel microstructure which is dominated by tempered martensite and which contains 2% or more retained austenite on a volume fraction basis and therefore has enhanced low-cycle fatigue resistance. However, this technique requires quenching treatment and reheating-tempering treatment after hot rolling for purposes of obtaining a microstructure dominated by tempered martensite and therefore has problems with productivity and manufacturing costs. This technique provides a yield strength of up to about 800 MPa and is unsuitable for manufacturing coiled tubing with particularly a yield strength of 130 ksi (896 MPa) or more.

Patent Literature 3 proposes an electric resistance welded steel tube, having a yield strength of 140 ksi (965 MPa) or more and excellent low-cycle fatigue resistance, for coiled tubing, the electric resistance welded steel pipe having a steel microstructure dominated by tempered martensite, and also proposes a method for manufacturing the same. However, this technique, as well as Patent Literature 2, requires whole-tube quenching treatment and reheating-tempering treatment after subjecting a hot-rolled steel sheet to electric resistance welding and therefore has problems with productivity and manufacturing costs.

CITATION LIST

Patent Literature

PTL 1: Domestic Re-publication of PCT International Publication for Patent Application No. 2013-108861
PTL 2: Japanese Unexamined Patent Application Publication No. 2001-303206
PTL 3: Japanese Unexamined Patent Application Publication No. 2014-208888

SUMMARY

Technical Problem

When the microstructure of a steel tube for coiled tubing is dominated by tempered martensite as described in the technique in each of Patent Literatures 2 and 3, tempered martensite needs to be formed by heat treatment after electric resistance welding. This is due to reasons below:
(i) When an as-hot-rolled microstructure is dominated by martensite, workability necessary for roll forming is insufficient.
(ii) When a microstructure is dominated by tempered martensite formed by heat treatment prior to roll forming, whole-tube heat treatment is necessary again for the purpose of improving the quality of an electric resistance weld, though roll forming is possible.

From the above reasons, a steel tube, having a microstructure dominated by tempered martensite, for coiled tubing is manufactured by performing reheating-tempering treatment in addition to whole-tube quenching treatment after electric resistance welding as proposed in Patent Literature 3 or the like and therefore has problems with productivity and manufacturing costs.

As described above, the following technique has not been established: a technique for providing an electric resistance welded steel tube, having a yield strength of 130 ksi (896 MPa) or more and excellent low-cycle fatigue resistance, for coiled tubing without performing whole-tube quenching treatment and reheating-tempering treatment after performing electric resistance welding in consideration of the increase of productivity and the reduction of manufacturing costs.

The disclosed embodiments have been made in view of the above problems and has an object to provide an electric resistance welded steel tube, having a yield strength of 130 ksi (896 MPa) or more and excellent low-cycle fatigue resistance, for coiled tubing without performing whole-tube quenching treatment and reheating-tempering treatment after performing electric resistance welding and a method for manufacturing the same.

Herein, the term "excellent low-cycle fatigue resistance" means that the number of cycles to fracture in a tensile fatigue test which is strain-controlled to a strain ratio of 0 (pulsating) and a total strain range of 2.5% is 250 or more. Incidentally, the point in time when a test load decreases to 75% of the maximum load is taken as fracture herein.

Solution to Problem

In order to achieve the above objective, the inventors have carried out investigations for the purpose of obtaining steel having a microstructure dominated by bainite, which can be formed during hot rolling, a yield strength of 130 ksi (896 MPa) or more, and excellent low-cycle fatigue resistance without performing whole-tube quenching treatment and reheating-tempering treatment after electric resistance welding. As a result, the inventors have found that an increase in uniform elongation is important in improving the low-cycle fatigue resistance. In particular, a uniform elongation of 9.0% or more is necessary.

In low-cycle fatigue, necking near a crack tip and the development of a crack due thereto are repeated, leading to the fracture of material. Therefore, material with a larger uniform elongation has more excellent low-cycle fatigue resistance because the work hardenability thereof is higher, the occurrence of necking is delayed, and the development of a crack is suppressed.

The inventors have found that, in order to obtain a microstructure dominated by bainite, a yield strength of 130 ksi (896 MPa) or more, and excellent low-cycle fatigue resistance, it is necessary that the composition of steel is set to a predetermined range and the volume fraction of each of retained austenite, martensite, and bainite is set to a predetermined range.

The disclosed embodiments are based on the above finding and provides Items [1] and [3] below.

[1] An electric resistance welded steel tube for coiled tubing has a composition containing C: more than 0.10% to 0.16%, Si: 0.1% to 0.5%, Mn: 1.6% to 2.5%, P: 0.02% or less, S: 0.005% or less, Al: 0.01% to 0.07%, Cr: more than 0.5% to 1.5%, Cu: 0.1% to 0.5%, Ni: 0.1% to 0.3%, Mo: 0.1% to 0.3%, Nb: 0.01% to 0.05%, V: 0.01% to 0.10%, Ti: 0.005% to 0.05%, and N: 0.005% or less on a mass basis, the remainder being Fe and inevitable impurities; has a microstructure containing 2% to 10% retained austenite and 20% or less martensite on a volume fraction basis, the remainder being bainite; and also has a yield strength of 896 MPa or more and a uniform elongation of 9.0% or more.

[2] The electric resistance welded steel tube for coiled tubing specified in Item [1] further contains one or two selected from Sn: 0.001% to 0.005% and Ca: 0.001% to 0.003% on a mass basis in addition to the composition.

[3] A method for manufacturing the electric resistance welded steel tube for coiled tubing specified in Item [1] or [2] includes a process of heating a steel tube, manufactured by roll-forming a steel strip into a tube shape and being subjected to electric resistance welding, to a temperature of 650° C. to 850° C.

Whole-tube quenching treatment and reheating-tempering treatment, unnecessary in the disclosed embodiments, after electric resistance welding mean that after a steel tube is heated to a temperature not lower than the $Ac_3$ temperature over the entire circumference and length thereof so as to be austenitized, the steel tube is cooled at a cooling rate of 30° C./s or more and that a steel tube is heated to a temperature of 500° C. to 800° C. over the entire circumference and length thereof after whole-tube quenching treatment and is then air-cooled, respectively, and are different from treatment for heating to a temperature of 650° C. to 850° C. after electric resistance welding in the disclosed embodiments.

In the disclosed embodiments, the uniform elongation can be measured in terms of nominal strain at the maximum load after yield by tensile testing at a cross-head speed of 10 mm/min.

In the disclosed embodiments, the yield strength can be measured in terms of 0.2% proof stress according to the API-5ST standard by tensile testing at a cross-head speed of 10 mm/min.

Advantageous Effects

According to the disclosed embodiments, an electric resistance welded steel tube, having a yield strength of 130 ksi (896 MPa) or more and excellent low-cycle fatigue resistance, for coiled tubing can be manufactured with high productivity and low cost.

BRIEF DESCRIPTION OF THE DRAWINGS

FIG. 1 is a graph showing the relationship between the volume fraction of retained austenite and the number of cycles to fracture in a tensile fatigue test.

DETAILED DESCRIPTION

An electric resistance welded steel tube for coiled tubing according to the disclosed embodiments has a composition containing C: more than 0.10% to 0.16%, Si: 0.1% to 0.5%, Mn: 1.6% to 2.5%, P: 0.02% or less, S: 0.005% or less, Al: 0.01% to 0.07%, Cr: more than 0.5% to 1.5%, Cu: 0.1% to 0.5%, Ni: 0.1% to 0.3%, Mo: 0.1% to 0.3%, Nb: 0.01% to 0.05%, V: 0.01% to 0.10%, Ti: 0.005% to 0.05%, and N: 0.005% or less on a mass basis, the remainder being Fe and inevitable impurities; has a microstructure containing 2% to 10% retained austenite and 20% or less martensite on a volume fraction basis, the remainder being bainite; and also has a yield strength of 896 MPa or more and a uniform elongation of 9.0% or more.

First, reasons for limiting the composition of steel for an electric resistance welded steel tube according to the disclosed embodiments are described below. In the specification, the unit "%" used to express the composition of steel refers to "mass percent" unless otherwise specified.

C: more than 0.10% to 0.16%

C is an element which increases the strength of steel and which contributes to the stabilization of austenite. Therefore, in order to ensure a desired strength and retained austenite fraction, more than 0.10% C needs to be contained. However, when the content of C is more than 0.16%, the weldability is poor. Therefore, the C content is set to more than 0.10% to 0.16%. The C content is preferably 0.11% or more and is preferably 0.13% or less.

Si: 0.1% to 0.5%

Si is an element which acts as a deoxidizer and which suppresses the formation of scales during hot rolling to contribute to the reduction in amount of scale-off. In order to obtain such an effect, 0.1% or more Si needs to be contained. However, when the content of Si is more than 0.5%, the weldability is poor. Therefore, the Si content is set to 0.1% to 0.5%. The Si content is preferably 0.2% or more and is preferably 0.4% or less.

Mn: 1.6% to 2.5%

Mn is an element which increases the strength of steel, which contributes to the stabilization of austenite, and which delays a ferrite transformation during cooling after finish rolling to contribute to forming a bainite-dominated microstructure. In order to ensure a desired strength and microstructure, 1.6% or more Mn needs to be contained. However, when the content of Mn is more than 2.5%, the weldability is poor, the fraction of retained austenite is high, and therefore no desired yield strength is obtained. Therefore, the Mn content is set to 1.6% to 2.5%. The Mn content is preferably 1.8% or more and is preferably 2.1% or less.

P: 0.02% or less

P segregates at grain boundaries to cause the heterogeneity of material and therefore the content of P is preferably minimized as an inevitable impurity. A P content of up to about 0.02% is acceptable. Therefore, the P content is set within a range of 0.02% or less. The P content is preferably 0.01% or less.

S: 0.005% or less

S is usually present in steel in the form of MnS. MnS is thinly extended in a hot rolling process to negatively affect the ductility. Therefore, in the disclosed embodiments, the content of S is preferably minimized. An S content of up to about 0.005% is acceptable. Therefore, the S content is set to 0.005% or less. The S content is preferably 0.003% or less.

Al: 0.01% to 0.07%

Al is an element acting as a strong deoxidizer. In order to obtain such an effect, 0.01% or more Al needs to be contained. However, when the content of Al is more than 0.07%, the amount of alumina inclusions is large and surface properties are poor. Therefore, the Al content is set to 0.01% to 0.07%. The Al content is preferably 0.02% or more and is preferably 0.05% or less.

Cr: more than 0.5% to 1.5%

Cr is also an element added for the purpose of imparting corrosion resistance. Cr increases the resistance to temper softening and therefore suppresses softening during whole-tube heat treatment after tube making. In order to obtain such an effect, more than 0.5% Cr needs to be contained. However, when the content of Cr is more than 1.5%, the weldability is poor. Therefore, the Cr content is set to more than 0.5% to 1.5%. The Cr content is preferably more than 0.5% to 1.0%. The Cr content is more preferably 0.8% or less.

Cu: 0.1% to 0.5%

Cu, as well as Cr, is an element added for the purpose of imparting corrosion resistance. In order to obtain such an effect, 0.1% or more Cu needs to be contained. However, when the content of Cu is more than 0.5%, the weldability is poor. Therefore, the Cu content is set to 0.1% to 0.5%. The Cu content is preferably 0.2% or more and is preferably 0.4% or less.

Ni: 0.1% to 0.3%

Ni, as well as Cr and Cu, is an element added for the purpose of imparting corrosion resistance. In order to obtain such an effect, 0.1% or more Ni needs to be contained. However, when the content of Ni is more than 0.3%, the weldability is poor. Therefore, the Ni content is set to 0.1% to 0.3%. The Ni content is preferably 0.1% to 0.2%.

Mo: 0.1% to 0.3%

Mo is an element contributing to the stabilization of austenite. Therefore, in the disclosed embodiments, 0.1% or more Mo needs to be contained for the purpose of ensuring a desired strength and retained austenite fraction. However, when the content of Mo is more than 0.3%, the weldability is poor, the fraction of martensite is high, and no desired strength is obtained. Therefore, the Mo content is set to 0.1% to 0.3%. The Mo content is preferably 0.2% to 0.3%.

Nb: 0.01% to 0.05%

Nb is an element which precipitates in the form of fine NbC during hot rolling to contribute to increasing the strength. Therefore, 0.01% or more Nb needs to be contained for the purpose of ensuring a desired strength. However, when the content of Nb is more than 0.05%, Nb is unlikely to form a solid solution at a hot-rolling heating temperature and an increase in strength appropriate to the content thereof is not achieved. Therefore, the Nb content is set to 0.01% to 0.05%. The Nb content is preferably 0.03% to 0.05%.

V: 0.01% to 0.10%

V is an element which precipitates in the form of fine carbonitrides during hot rolling to contribute to increasing the strength. Therefore, 0.01% or more V needs to be contained for the purpose of ensuring a desired strength. However, when the content of V is more than 0.10%, coarse precipitates are formed to reduce the weldability. Therefore, the V content is set to 0.01% to 0.10%. The V content is preferably 0.04% or more and is preferably 0.08% or less.

Ti: 0.005% to 0.05%

Ti precipitates in the form of TiN to inhibit the bonding between Nb and N, thereby precipitating fine NbC. As described above, Nb is an element which is important from the viewpoint of increasing the strength of steel. In the case where Nb combines with N, NbC derived from Nb(CN) precipitates and high strength is unlikely to be obtained. In order to obtain such an effect, 0.005% or more Ti needs to be contained. However, when the content of Ti is more than 0.05%, the amount of TiC is large and the amount of fine NbC is small. Therefore, the Ti content is set to 0.005% to 0.05%. The Ti content is preferably 0.010% or more and is preferably 0.03% or less.

N: 0.005% or less

Although N is an inevitable impurity, the formation of Nb nitrides reduces the amount of fine NbC. Therefore, the content of N is set within a range of 0.005% or less. The N content is preferably 0.003% or less.

The remainder other than the above components are Fe and inevitable impurities. As inevitable impurities, Co: 0.1% or less and B: 0.0005% or less, are acceptable.

The above components are fundamental components of the steel for the electric resistance welded steel tube according to the disclosed embodiments. In addition to these, one or two selected from Sn: 0.001% to 0.005% and Ca: 0.001% to 0.003% may be contained.

Sn: 0.001% to 0.005%

Sn is added for corrosion resistance as required. In order to obtain such an effect, 0.001% or more Sn is contained. However, when the content of Sn is more than 0.005%, Sn segregates to cause unevenness in strength in some cases. Therefore, when Sn is contained, the Sn content is preferably set to 0.001% to 0.005%.

Ca: 0.001% to 0.003%

Ca is an element which spheroidizes sulfides, such as MnS, thinly elongated in the hot rolling process to contribute to increasing the toughness of steel and which is added as required. In order to obtain such an effect, 0.001% or more Ca is contained. However, when the content of Ca is more than 0.003%, Ca oxide clusters are formed in steel to impair the toughness in some cases. Therefore, when Ca is contained, the Ca content is set to 0.001% to 0.003%.

Next, reasons for limiting the microstructure of the electric resistance welded steel tube according to the disclosed embodiments are described.

The electric resistance welded steel tube according to the disclosed embodiments has a microstructure containing 2% to 10% retained austenite and 20% or less martensite on a volume fraction basis, the remainder being bainite.

The reason why the microstructure is dominated by bainite (70% or more) is to obtain a desired yield strength.

Since martensite is harder than bainite and introduces movable dislocations into surrounding bainite when being formed, martensite reduces the yield strength and increases the uniform elongation. However, when the volume fraction thereof is more than 20%, no desired yield strength is obtained. In the disclosed embodiments, the volume fraction of martensite is preferably 15% or less. The volume fraction thereof is preferably 3% or more and more preferably 5% or more.

Since retained austenite transforms gradually into martensite, which is hard, until material is necked, retained austenite reduces the yield strength and increases the uniform elongation. In order to obtain such an effect, the volume fraction thereof needs to be 2% or more and the average grain size thereof is preferably 1 μm or less. However, when the volume fraction thereof is more than 10%, no desired yield strength is obtained. The volume fraction thereof is preferably 4% to 8%.

Herein, the volume fraction of retained austenite is measured by X-ray diffraction. The volume fractions of martensite and bainite are measured from a SEM image obtained using a scanning electron microscope (SEM, a magnification of 2,000 times to 5,000 times). In SEM images, it is difficult to distinguish martensite and retained austenite. Therefore, the area fraction of a microstructure found to be martensite or retained austenite is measured from the obtained SEM image and is converted into the volume fraction of martensite or retained austenite and a value obtained by subtracting the volume fraction of retained austenite therefrom is taken as the volume fraction of martensite. The volume fraction of bainite is calculated as the rest other than martensite and retained austenite.

Next, a method for manufacturing the electric resistance welded steel tube according to the disclosed embodiments is described.

In the disclosed embodiments, for example, steel, such as a slab, containing the above components is not particularly limited and is heated to a temperature of 1,150° C. to 1,280° C., followed by hot rolling under conditions including a finishing rolling temperature of 840° C. to 920° C. and a coiling temperature of 500° C. to 600° C.

When the heating temperature in a hot rolling process is lower than 1,150° C., the remelting of coarse Nb and V carbonitrides is insufficient, thereby causing a reduction in strength. However, when the heating temperature is higher than 1,280° C., austenite grains are coarsened and the number of sites for forming precipitates during hot rolling is reduced, thereby causing a reduction in strength. Therefore, the heating temperature in the hot rolling process is preferably 1,150° C. to 1,280° C.

When the finishing rolling temperature is lower than 840° C., ferrite, which is soft, is formed, thereby causing a reduction in strength. Furthermore, shape deterioration due to residual stress after slitting is significant. However, when the finishing rolling temperature is higher than 920° C., the rolling reduction in the unrecrystallized austenite region is insufficient, no fine austenite grains are obtained, and the number of sites for forming precipitates is reduced, thereby causing a reduction in strength. Therefore, the finishing rolling temperature is preferably 840° C. to 920° C.

When the coiling temperature is lower than 500° C., the formation of Nb and V precipitates is suppressed, thereby causing a reduction in strength. However, when the coiling temperature is higher than 600° C., ferrite, which is soft, is formed and coarse Nb and V precipitates are also formed, thereby causing a reduction in strength. Therefore, the coiling temperature is preferably 500° C. to 600° C.

The hot-rolled steel sheet may be pickled or shot-blasted for the purpose of removing oxidized scales from surface layers.

Subsequently, the hot-rolled steel sheet (steel strip) is roll-formed into a tube shape and is subjected to electric resistance welding, whereby a steel tube is obtained. The steel tube is heated to a temperature of 650° C. to 850° C. This heat treatment is hereinafter referred to as "annealing". The annealing improves the quality of an electric resistance weld; increases the volume fraction of retained austenite; and enables a microstructure containing 2% to 10% retained austenite and 20% or less martensite, the remainder being bainite, to be obtained.

When the annealing temperature is lower than 650° C., the temperature is lower than or equal to the $Ac_1$ temperature and therefore no desired retained austenite volume fraction is obtained. However, when the annealing temperature is higher than 850° C., a large amount of austenite is formed, C is not sufficiently concentrated in austenite, and a martensite transformation occurs during cooling; hence, no desired retained austenite volume fraction or martensite volume fraction is obtained. Therefore, the annealing temperature is set to 650° C. to 850° C. The annealing temperature is preferably 680° C. or more and is preferably 750° C. or less.

For cooling after annealing, in order to avoid the formation of pearlite, the average cooling rate from the cooling start temperature to 400° C. is preferably set to 10° C./s or more and, for example, water cooling is preferable. In the disclosed embodiments, whole-tube quenching treatment and reheating-tempering treatment are unnecessary to manufacture a steel tube by subjecting the hot-rolled steel sheet to electric resistance welding, thereby enabling an increase in productivity and the reduction of manufacturing costs to be achieved.

Examples

The disclosed embodiments are further described below with reference to examples.

Steels having a composition shown in Table 1 were produced in a converter and were formed into slabs (steels) by a continuous casting process. After being heated to 1,200° C., these were hot-rolled at a finishing rolling temperature and coiling temperature shown in Table 1, whereby hot-rolled steel sheets with a finish thickness of 3.3 mm were obtained. JIS No. 5 tensile specimens (a gauge length of 50 mm, a parallel portion width of 25 mm) were cut out of the obtained hot-rolled steel sheets such that a rolling direction (hereinafter referred to as the L direction) was parallel to a tensile direction, followed by applying the 6% tensile strain corresponding to the L-direction tube-making strain to the specimens using a tensile tester. After the specimens were subjected to annealing simulating whole-tube heat treatment at various temperatures for 30 seconds and were cooled, the specimens were subjected to a tensile test. Furthermore, the specimens heat-treated under the above conditions were observed for microstructure, was measured for retained austenite volume fraction, and was evaluated for low-cycle fatigue resistance.

The tensile test was performed at a cross head speed of 10 mm/min. In accordance with the API-5ST standard, the 0.2% proof stress was taken as the yield strength. The tensile strength was taken as the nominal stress at the maximum load after yield. The uniform elongation was taken as the nominal strain at the maximum load after yield.

The volume fractions of martensite and bainite were measured from a SEM image obtained using a scanning electron microscope (SEM, a magnification of 2,000 times to 5,000 times). In SEM images, it was difficult to distinguish martensite and retained austenite. Therefore, the area fraction of a microstructure found to be martensite or retained austenite was measured from the obtained SEM image and was converted into the volume fraction of martensite or retained austenite and a value obtained by subtracting the volume fraction of retained austenite therefrom was taken as the volume fraction of martensite. The volume fraction of bainite was calculated as the rest other than martensite and retained austenite. The volume fractions of ferrite and pearlite were similarly determined from the SEM image. A sample for observation was prepared in such a manner that the sample was taken such that an observation surface corresponded to a rolling-direction cross section during hot rolling, followed by polishing and then nital etching. The area fraction of a microstructure was calculated in such a manner that five or more fields of view were observed at a through-thickness one-half position and measurements obtained in the fields of view were averaged.

The volume fraction of retained austenite was measured by X-ray diffraction. A sample for measurement was prepared in such a manner that the sample was ground such that a diffraction plane was located at a through-thickness one-half position, followed by removing a surface processed layer by chemical polishing. Mo-Kα radiation was used for measurement and the volume fraction of retained austenite was determined from the integrated intensities of the (200), (220) and (311) planes of fcc iron and the (200) and (211) planes of bcc iron.

The unannealed hot-rolled steel sheets were measured for microstructure on the basis of the about measurement method.

The low-cycle fatigue resistance was evaluated by the number of cycles to fracture in a tensile fatigue test. Specimens were prepared from hot-rolled steel sheets which were produced so as to contain the same components as that of the above hot-rolled steel sheets, which were rolled under the same hot rolling conditions as those applying to the above hot-rolled steel sheets, and which had a finish thickness of 15 mm. The specimens were worked into round bars having a parallel portion diameter of 4.5 mm and a parallel portion length of 12 mm. The test was performed by strain control with a strain ratio of 0 (pulsating) and a total strain range of 2.5%.

Table 2 shows mechanical properties of Steel Nos. 1 to 22 in Table 1. The case where the yield strength YS was 130 ksi (896 MPa) or more was rated acceptable. The case where the number of cycles to fracture was 250 or more in the tensile fatigue test was rated acceptable. The case where the uniform elongation was 9.0% or more was rated acceptable.

TABLE 1

| Steel No. | Composition (mass percent) | | | | | | | | | | | | | | |
|---|---|---|---|---|---|---|---|---|---|---|---|---|---|---|---|
| | C | Si | Mn | P | S | Al | Cr | Cu | Ni | Mo | Nb | V | Ti | N | Sn |
| 1 | 0.115 | 0.36 | 1.94 | 0.010 | 0.0024 | 0.032 | 0.61 | 0.28 | 0.16 | 0.25 | 0.042 | 0.061 | 0.018 | 0.0035 | — |
| 2 | 0.115 | 0.36 | 1.94 | 0.010 | 0.0024 | 0.032 | 0.61 | 0.28 | 0.16 | 0.25 | 0.042 | 0.061 | 0.018 | 0.0035 | — |
| 3 | 0.115 | 0.36 | 1.94 | 0.010 | 0.0024 | 0.032 | 0.61 | 0.28 | 0.16 | 0.25 | 0.042 | 0.061 | 0.018 | 0.0035 | — |
| 4 | 0.113 | 0.34 | 1.97 | 0.013 | 0.0024 | 0.032 | 0.60 | 0.41 | 0.20 | 0.26 | 0.042 | 0.060 | 0.015 | 0.0035 | — |
| 5 | 0.135 | 0.34 | 1.96 | 0.011 | 0.0022 | 0.039 | 0.60 | 0.27 | 0.18 | 0.26 | 0.041 | 0.060 | 0.015 | 0.0031 | 0.002 |
| 6 | 0.113 | 0.35 | 1.97 | 0.010 | 0.0021 | 0.034 | 0.60 | 0.27 | 0.17 | 0.25 | 0.003 | 0.001 | 0.016 | 0.0028 | — |
| 7 | 0.110 | 0.36 | 1.41 | 0.009 | 0.0021 | 0.035 | 0.60 | 0.27 | 0.17 | 0.02 | 0.040 | 0.060 | 0.016 | 0.0035 | — |
| 8 | 0.090 | 0.39 | 1.97 | 0.010 | 0.0020 | 0.048 | 0.62 | 0.27 | 0.17 | 0.26 | 0.046 | 0.064 | 0.016 | 0.0029 | 0.002 |
| 9 | 0.152 | 0.28 | 1.65 | 0.005 | 0.0025 | 0.030 | 0.60 | 0.30 | 0.16 | 0.25 | 0.040 | 0.070 | 0.035 | 0.0025 | — |
| 10 | 0.121 | 0.44 | 2.30 | 0.008 | 0.0030 | 0.042 | 0.85 | 0.14 | 0.13 | 0.20 | 0.035 | 0.022 | 0.013 | 0.0040 | — |
| 11 | 0.140 | 0.47 | 1.83 | 0.012 | 0.0024 | 0.061 | 0.70 | 0.35 | 0.20 | 0.19 | 0.019 | 0.060 | 0.017 | 0.0034 | — |
| 12 | 0.140 | 0.47 | 1.83 | 0.012 | 0.0024 | 0.061 | 0.70 | 0.35 | 0.20 | 0.28 | 0.019 | 0.060 | 0.017 | 0.0034 | — |
| 13 | 0.121 | 0.34 | 2.40 | 0.008 | 0.0030 | 0.040 | 0.85 | 0.14 | 0.13 | 0.17 | 0.035 | 0.022 | 0.013 | 0.0040 | — |
| 14 | 0.114 | 0.36 | 1.45 | 0.011 | 0.0027 | 0.036 | 0.60 | 0.29 | 0.15 | 0.25 | 0.040 | 0.061 | 0.019 | 0.0038 | — |
| 15 | 0.132 | 0.35 | 2.31 | 0.011 | 0.0020 | 0.045 | 0.61 | 0.27 | 0.16 | 0.04 | 0.043 | 0.061 | 0.019 | 0.0024 | — |
| 16 | 0.112 | 0.35 | 1.94 | 0.010 | 0.0023 | 0.030 | 0.61 | 0.26 | 0.16 | 0.24 | 0.004 | 0.060 | 0.017 | 0.0029 | — |
| 17 | 0.118 | 0.33 | 1.96 | 0.012 | 0.0025 | 0.033 | 0.59 | 0.25 | 0.18 | 0.26 | 0.041 | 0.002 | 0.019 | 0.0026 | — |
| 18 | 0.114 | 0.36 | 1.95 | 0.010 | 0.0024 | 0.029 | 0.60 | 0.28 | 0.17 | 0.26 | 0.042 | 0.060 | 0.003 | 0.0033 | — |
| 19 | 0.087 | 0.35 | 1.93 | 0.009 | 0.0021 | 0.032 | 0.60 | 0.28 | 0.16 | 0.25 | 0.043 | 0.062 | 0.017 | 0.0037 | — |
| 20 | 0.143 | 0.34 | 1.94 | 0.010 | 0.0030 | 0.036 | 1.45 | 0.28 | 0.17 | 0.25 | 0.041 | 0.060 | 0.017 | 0.0028 | — |
| 21 | 0.119 | 0.36 | 2.02 | 0.011 | 0.0026 | 0.034 | 0.41 | 0.27 | 0.17 | 0.24 | 0.040 | 0.061 | 0.018 | 0.0033 | — |
| 22 | 0.110 | 0.37 | 1.89 | 0.009 | 0.0035 | 0.033 | 0.60 | 0.28 | 0.17 | 0.25 | 0.041 | 0.060 | 0.055 | 0.0034 | — |

| Steel No. | Composition (mass percent) Ca | Finishing rolling temperature (°C.) | Coiling temperature (°C.) | Unannealed microstructure (corresponding to hot-rolled steel sheet)* | | | | Annealing temperature (°C.) | Annealed microstructure (corresponding to steel tube)* | | | | Remarks |
|---|---|---|---|---|---|---|---|---|---|---|---|---|---|
| | | | | Type | Volume fraction (%) A | M | B | | Type | Volume fraction (%) A | M | B | |
| 1 | — | 900 | 540 | B + M | 0 | 6 | 94 | 720 | B + M + A | 3 | 10 | 87 | Example |
| 2 | — | 900 | 540 | B + M | 0 | 6 | 94 | 600 | B + M + A | 1 | 4 | 95 | Comparative example |

TABLE 1-continued

| | | | | | | | | | | | | | |
|---|---|---|---|---|---|---|---|---|---|---|---|---|---|
| 3 | — | 900 | 540 | B + M | 0 | 6 | 94 | <u>860</u> | <u>M</u> | <u>0</u> | <u>100</u> | 0 | Comparative example |
| 4 | 0.0022 | 880 | 510 | B + M | 0 | 4 | 96 | 720 | B + M + A | 3 | 11 | 86 | Example |
| 5 | 0.0026 | 860 | 530 | B + M + A | 1 | 12 | 87 | 700 | B + M + A | 4 | 10 | 86 | Example |
| 6 | — | 890 | 550 | B + M | 0 | 8 | 92 | 700 | B + M + A | 2 | 9 | 89 | Comparative example |
| 7 | — | 850 | 540 | F + P | 0 | 0 | 0 | 660 | <u>F + P</u> | <u>0</u> | 0 | 0 | Comparative example |
| 8 | 0.0029 | 870 | 580 | B + M | 0 | 5 | 95 | 660 | B + M | <u>0</u> | 6 | 94 | Comparative example |
| 9 | — | 910 | 530 | B + M + A | 2 | 11 | 87 | 680 | B + M + A | 5 | 11 | 84 | Example |
| 10 | — | 850 | 550 | B + M + A | 7 | 17 | 76 | 680 | B + M + A | 8 | 16 | 76 | Example |
| 11 | — | 890 | 570 | B + M + A | 4 | 7 | 89 | 830 | B + M + A | 7 | 13 | 80 | Example |
| 12 | — | 890 | 570 | B + M + A | 7 | 7 | 86 | <u>880</u> | B + M + A | <u>13</u> | 18 | 69 | Comparative example |
| 13 | — | 850 | 550 | B + M + A | 4 | 17 | 79 | <u>880</u> | B + M | 4 | <u>26</u> | 70 | Comparative example |
| 14 | — | 880 | 530 | F + P | 0 | 0 | 0 | 660 | <u>F + P</u> | <u>0</u> | 0 | 0 | Comparative example |
| 15 | — | 920 | 580 | B + M | 0 | 2 | 98 | 700 | B + M | <u>0</u> | 3 | 97 | Comparative example |
| 16 | — | 890 | 550 | B + M | 0 | 6 | 94 | 700 | B + M + A | 3 | 8 | 89 | Comparative example |
| 17 | — | 860 | 570 | B + M + A | 1 | 9 | 90 | 750 | B + M + A | 4 | 11 | 85 | Comparative example |
| 18 | — | 870 | 560 | B + M | 0 | 4 | 96 | 750 | B + M + A | 2 | 9 | 89 | Comparative example |
| 19 | — | 880 | 540 | B + M | 0 | 3 | 97 | 750 | B + M | <u>0</u> | 4 | 96 | Comparative example |
| 20 | — | 860 | 550 | B + M + A | 4 | 9 | 87 | 750 | B + M + A | 7 | 14 | 79 | Example |
| 21 | — | 880 | 560 | B + M | 0 | 2 | 98 | 750 | B + M + A | 4 | 6 | 90 | Comparative example |
| 22 | — | 850 | 560 | B + M | 0 | 10 | 90 | 740 | B + M + A | 3 | 16 | 81 | Comparative example |

In the composition, the remainder other than the above are Fe and inevitable impurities.
Underlined letters are outside the scope of the disclosed embodiments.
*F: ferrite, P: pearlite, B: bainite, M: martensite, A: retained austenite

TABLE 2

| Steel No. | Yield strength YS (MPa) | Tensile strength TS (MPa) | Uniform elongation (%) | Number of cycles to fracture in tensile fatigue test (times) | Remarks |
|---|---|---|---|---|---|
| 1 | 936 | 976 | 9.3 | 261 | Example |
| 2 | 1042 | 1032 | <u>6.3</u> | 210 | Comparative example |
| 3 | 1129 | 1402 | <u>4.7</u> | 157 | Comparative example |
| 4 | 912 | 968 | 9.1 | 275 | Example |
| 5 | 940 | 984 | 9.4 | 270 | Example |
| 6 | <u>770</u> | 819 | 9.3 | 253 | Comparative example |
| 7 | <u>686</u> | 742 | 9.8 | 254 | Comparative example |
| 8 | <u>731</u> | 765 | <u>8.5</u> | 196 | Comparative example |
| 9 | 922 | 994 | 9.5 | 279 | Example |
| 10 | 904 | 1017 | 9.7 | 282 | Example |
| 11 | 945 | 988 | 9.4 | 267 | Example |
| 12 | <u>840</u> | 1128 | 10.3 | 288 | Comparative example |
| 13 | <u>733</u> | 1261 | 9.2 | 271 | Comparative example |
| 14 | <u>714</u> | 759 | 9.1 | 270 | Comparative example |
| 15 | 921 | 975 | <u>8.6</u> | 233 | Comparative example |
| 16 | <u>809</u> | 858 | 9.2 | 260 | Comparative example |
| 17 | <u>790</u> | 864 | 9.3 | 264 | Comparative example |
| 18 | <u>834</u> | 922 | 9.0 | 254 | Comparative example |
| 19 | <u>887</u> | 935 | <u>8.7</u> | 232 | Comparative example |
| 20 | 951 | 982 | 9.3 | 268 | Example |
| 21 | <u>852</u> | 938 | 9.2 | 261 | Comparative example |
| 22 | <u>697</u> | 904 | 9.9 | 277 | Comparative example |

Underlined letters are outside the scope of the disclosed embodiments.

In Tables 1 and 2, Steel Nos. 1, 4, 5, 9 to 11, and 20 are Examples and Steel Nos. 2, 3, 6 to 8, 12 to 19, 21, and 22 are Comparative Examples. In Table 1, among these, Steel Nos. 1 to 3 are examples in which samples taken from the same hot-rolled steel sheet were annealed at different temperatures. Among the Examples, Steel No. 4 is an example added with Ca and Steel No. 5 is an example added with Sn and Ca. The microstructures of these were dominated by bainite and had a retained austenite fraction of 2% to 10% and a martensite fraction of 20% or less and the uniform elongation was 9.0% or more. The Examples exhibited a yield strength of 130 ksi (896 MPa) or more, that the number of cycles to fracture was 250 or more in the tensile fatigue test, a yield strength of 130 ksi (896 MPa) or more, and more excellent low-cycle fatigue resistance as compared to the Comparative Examples. In the Examples, an increase in productivity and the reduction of manufacturing costs could be achieved without performing whole-tube heat treatment and reheating-tempering treatment.

However, the annealing temperature and annealed microstructure of Steel Nos. 2 and 3, which were Comparative Examples, were outside the scope of the disclosed embodiments and Steel Nos. 2 and 3 exhibited a uniform elongation of less than 9.0% and poorer low-cycle fatigue resistance as compared to the Examples. Steel No. 6 had a Nb content and V content below the scope of the disclosed embodiments and exhibited a yield strength of less than 130 ksi. Since Steel No. 7 had a Mn content and Mo content below the scope of the disclosed embodiments and an annealed microstructure outside the scope of the disclosed embodiments, the yield strength thereof was short of 130 ksi. Steel Nos. 8 and 19 had a C content below the scope of the disclosed embodiments and an annealed microstructure outside the scope of the disclosed embodiments and exhibited a yield strength of less than 130 ksi, a uniform elongation of less than 9.0%, and poorer low-cycle fatigue resistance as compared to the Examples.

The annealing temperature and annealed microstructures of Steel Nos. 12 and 13 were outside the scope of the disclosed embodiments and the yield strength thereof was short of 130 ksi. Steel No. 14 had a Mn content below the scope of the disclosed embodiments and an annealed microstructure outside the scope of the disclosed embodiments and exhibited a yield strength of less than 130 ksi. Steel No. 15 had a Mo content below the scope of the disclosed embodiments and an annealed microstructure outside the scope of the disclosed embodiments and exhibited a uniform elongation of less than 9.0% and poorer low-cycle fatigue resistance as compared to the Examples. Steel No. 16, Steel No. 17, and Steel No. 18 had a Nb content, a V content, and a Ti content, respectively, below the scope of the disclosed embodiments and exhibited a yield strength of less than 130 ksi. Steel No. 21 had a Cr content below the scope of the disclosed embodiments and exhibited a yield strength of less than 130 ksi. Steel No. 22 had a Ti content above the scope of the disclosed embodiments and exhibited a yield strength of less than 130 ksi.

FIG. 1 is a graph obtained by plotting the number of cycles to fracture in the tensile fatigue test against the volume fraction of retained austenite for steels having a microstructure dominated by bainite, the remainder being martensite and retained austenite, in the Examples and the Comparative Examples.

As is clear from FIG. 1, using steel with a microstructure dominated by bainite and adjusting the volume fraction of retained austenite within the scope of the disclosed embodiments enable the low-cycle fatigue resistance to be significantly improved.

From the above, using steel with a microstructure dominated by bainite enables an electric resistance welded steel tube for coiled tubing to be manufactured with high productivity and low cost. Furthermore, adjusting the composition and microstructure of the steel within the scope of the disclosed embodiments enables a yield strength of 130 ksi (896 MPa) or more and excellent low-cycle fatigue resistance to be obtained.

The invention claimed is:

1. An electric resistance welded steel tube for coiled tubing having a chemical composition comprising, by mass %:
   C: more than 0.10% to 0.16%,
   Si: 0.1% to 0.5%,
   Mn: 1.6% to 2.5%,
   P: 0.02% or less,
   S: 0.005% or less,
   Al: 0.01% to 0.07%,
   Cr: more than 0.5% to 1.5%,
   Cu: 0.1% to 0.5%,
   Ni: 0.1% to 0.3%,
   Mo: 0.1% to 0.3%,
   Nb: 0.01% to 0.05%,
   V: 0.01% to 0.10%,
   Ti: 0.005% to 0.05%,
   N: 0.005% or less, and
   a balance being Fe and inevitable impurities,
   wherein the electric resistance welded steel tube has a microstructure comprising in a range of 2% to 10% retained austenite and 20% or less martensite on a volume fraction basis, and a remainder being bainite, and
   the electric resistance welded steel tube has a yield strength of 896 MPa or more and a uniform elongation of 9.0% or more.

2. The electric resistance welded steel tube for coiled tubing according to claim 1, wherein the chemical composition further comprises, by mass %, at least one of Sn: 0.001% to 0.005% and Ca: 0.001% to 0.003%.

3. The electric resistance welded steel tube for coiled tubing according to claim 1, wherein the microstructure comprises in a range of 3% to 20% martensite, and in a range of 70% to 95% bainite, on a volume fraction basis.

4. A method for manufacturing the electric resistance welded steel tube for coiled tubing according to claim 1, the method comprising:
   roll-forming a steel strip into a tube shape and subjecting the steel strip to electric resistance welding to form a steel tube; and
   heating the steel tube to a temperature in a range of 650° C. to 850° C. to form the electric resistance welded steel tube.

5. A method for manufacturing the electric resistance welded steel tube for coiled tubing according to claim 2, the method comprising:
   roll-forming a steel strip into a tube shape and subjecting the steel strip to electric resistance welding to form a steel tube; and
   heating the steel tube to a temperature in a range of 650° C. to 850° C. to form the electric resistance welded steel tube.

* * * * *